(12) United States Patent
Yurusov

(10) Patent No.: US 11,281,780 B2
(45) Date of Patent: Mar. 22, 2022

(54) SYSTEM AND METHOD FOR AUTHORIZING AND UNLOCKING FUNCTIONALITY EMBEDDED IN A SYSTEM

(71) Applicant: MediCapture, Inc., Plymouth Meeting, PA (US)

(72) Inventor: Alexander Yurusov, New Taipei (TW)

(73) Assignee: MediCapture, Inc., Plymouth Meeting, PA (US)

( * ) Notice: Subject to any disclaimer, the term of this patent is extended or adjusted under 35 U.S.C. 154(b) by 259 days.

(21) Appl. No.: 16/265,321

(22) Filed: Feb. 1, 2019

(65) Prior Publication Data
US 2019/0243978 A1    Aug. 8, 2019

Related U.S. Application Data

(60) Provisional application No. 62/627,448, filed on Feb. 7, 2018.

(51) Int. Cl.
*H04L 29/06* (2006.01)
*G06F 21/60* (2013.01)
(Continued)

(52) U.S. Cl.
CPC ........ *G06F 21/602* (2013.01); *G06F 12/1408* (2013.01); *G06F 21/10* (2013.01);
(Continued)

(58) Field of Classification Search
CPC .... G06F 21/602; G06F 21/1408; G06F 21/10; G06F 2212/1052; H04L 9/14; H04L 9/3247
See application file for complete search history.

(56) References Cited

U.S. PATENT DOCUMENTS

| | | | |
|---|---|---|---|
| 6,381,747 B1 * | 4/2002 | Wonfor | H04N 21/44204 725/104 |
| 7,379,549 B2 * | 5/2008 | Pelly | G06F 21/10 380/278 |

(Continued)

OTHER PUBLICATIONS

Authorized Officer: Shane Thomas, International Search Report and Written Opinion issued in counterpart PCT application No. PCT/US2019/017027, dated Apr. 23, 2019, 7 pp.
(Continued)

*Primary Examiner* — Ghodrat Jamshidi
(74) *Attorney, Agent, or Firm* — Kaplan Breyer Schwarz, LLP

(57) ABSTRACT

A system and method for authorizing and unlocking functionality embedded in a system is provided that utilizes a removable storage device that contains code for authenticating and unlocking additional functionality in a system. The code in the removable storage device can be a cryptographic key, a password, or any other type of digital signature. Thus, the system can provide a basic (or initial) level of functionality and one or more additional (or premium) levels of functionality that are not part of the basic level of functionality and that can be selectively accessed in exchange for, for example, additional payments or other consideration. A user can enable the one or more additional levels of functionality by, for example, providing payment to the system manufacturer or distributer.

20 Claims, 3 Drawing Sheets

(51) Int. Cl.
    *H04L 9/14* (2006.01)
    *G06F 12/14* (2006.01)
    *H04L 9/32* (2006.01)
    *G06F 21/10* (2013.01)
(52) U.S. Cl.
    CPC ............. *H04L 9/14* (2013.01); *H04L 9/3247* (2013.01); *G06F 2212/1052* (2013.01)

(56) References Cited

U.S. PATENT DOCUMENTS

| | | | | |
|---|---|---|---|---|
| 7,512,800 | B2* | 3/2009 | Hopkins | ................ G06Q 20/02 380/30 |
| 2005/0259965 | A1* | 11/2005 | Ishito | ..................... G11B 27/36 386/252 |
| 2007/0150072 | A1 | 6/2007 | Ono | |
| 2007/0288752 | A1* | 12/2007 | Chan | ....................... G06F 21/78 713/171 |
| 2010/0212012 | A1* | 8/2010 | Touboul | ................ G06F 21/554 726/23 |
| 2011/0087870 | A1* | 4/2011 | Spangler | ............... G06F 21/554 713/2 |
| 2011/0219229 | A1* | 9/2011 | Cholas | ..................... H04L 9/32 713/168 |
| 2012/0192253 | A1 | 7/2012 | Betsch et al. | |
| 2012/0226912 | A1 | 9/2012 | King | |
| 2013/0305028 | A1* | 11/2013 | Mo | ....................... G06F 21/572 713/2 |
| 2014/0297922 | A1* | 10/2014 | Sarangdhar | ............. G06F 13/16 711/103 |
| 2015/0121063 | A1* | 4/2015 | Maller | .................. H04L 63/045 713/153 |
| 2015/0332266 | A1* | 11/2015 | Friedlander | ........ G06Q 20/3274 705/75 |
| 2017/0289790 | A1* | 10/2017 | Singh | .................... H04W 8/183 |

OTHER PUBLICATIONS

Extended European Search Report issued in counterpart EP patent application No. 19750308.9, dated Sep. 24, 2021, 7 pp.

* cited by examiner

SYSTEM AND METHOD FOR AUTHORIZING AND UNLOCKING FUNCTIONALITY EMBEDDED IN A SYSTEM

STATEMENT OF RELATED CASES

This application claims priority to U.S. Provisional Application Ser. No. 62/627,448, filed Feb. 7, 2018, whose entire disclosure is incorporated herein by reference.

FIELD OF THE INVENTION

The present invention relates to systems that can be configured to provide different levels of functionality and, more particularly, to systems and methods for selectively unlocking one or more levels of functionality that are embedded in a system.

BACKGROUND OF THE INVENTION

Systems that can be configured to provide different levels of service or functionality depending on the customer/end user can create problems for sales, customer support, and distribution and tracking. For example, if a version A of a system with a first level of functionality and a version B of the system with a second level of functionality is distributed, sales tracking must include tracking version A and version B, customer support must differentiate between version A and version B, and updates must be generated and applied individually for version A and version B. Thus, there is a need for a single system that can selectively provide multiple levels of functionality, in order to eliminate the need to distribute multiple versions of the system.

SUMMARY OF THE INVENTION

An object of the invention is to solve at least the above problems and/or disadvantages and to provide at least the advantages described hereinafter.

The present invention provides a system that is capable of providing additional levels of functionality to a user once an additional payment (or other consideration) is provided. The system provides a basic (or initial) level of functionality and one or more additional (or premium) levels of functionality that are not part of the basic level of functionality and that can be selectively accessed in exchange for, for example, additional payments or other consideration. A user can enable the one or more additional levels of functionality by, for example, providing payment to the system manufacturer or distributer.

Upon receipt of payment or other consideration, a removable storage device (e.g., SD card, USB stick, etc.) is provided to the user via physical delivery (e.g., mail, parcel post, etc.) The removable storage device is inserted into a removable storage device interface in the system. When inserted, the removable storage device enables the additional level of functionality (or a subset thereof) that have been purchased. In some cases, the removable storage device upgrades the firmware of the system to enable the additional functionality. In other cases, the removable storage device provides a key, password, or other digital signature to enable the additional features. In some instances, the removable storage device enables the additional features only when coupled to the system and cannot be used for multiple systems simultaneously.

An embodiment of the invention is a system, comprising a memory module that stores code comprising a set of processor executable instructions for enabling a first mode of operation in which a first level of functionality is enabled and at least a second mode of operation in which at least a second level of functionality is enabled if the second mode of operation is authorized; a processor for executing the code stored in the memory module; and an interface for receiving a removable storage device that stores code comprising a set of processor executable instructions for authorizing the at least second mode of operation; wherein the processor determines whether the code stored in the removable storage device for authorizing the at least second mode of operation is a valid, and enables the at least second mode of operation if the code stored in the removable storage device is determined to be valid.

Another embodiment of the invention is a method of selectively enabling multiple modes of operation in a system, comprising enabling, with a processor, a first mode of operation in which a first level of functionality is enabled; coupling a removable storage device to the system, wherein the removable storage device stores code comprising a set of processor executable instructions for authorizing at least a second mode of operation; determining, with the processor, whether the code stored in the removable storage device is a valid; and enabling, with the processor, the at least second mode of operation in which at least a second level of functionality is enabled if the code stored in the removable storage device is determined to be valid.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
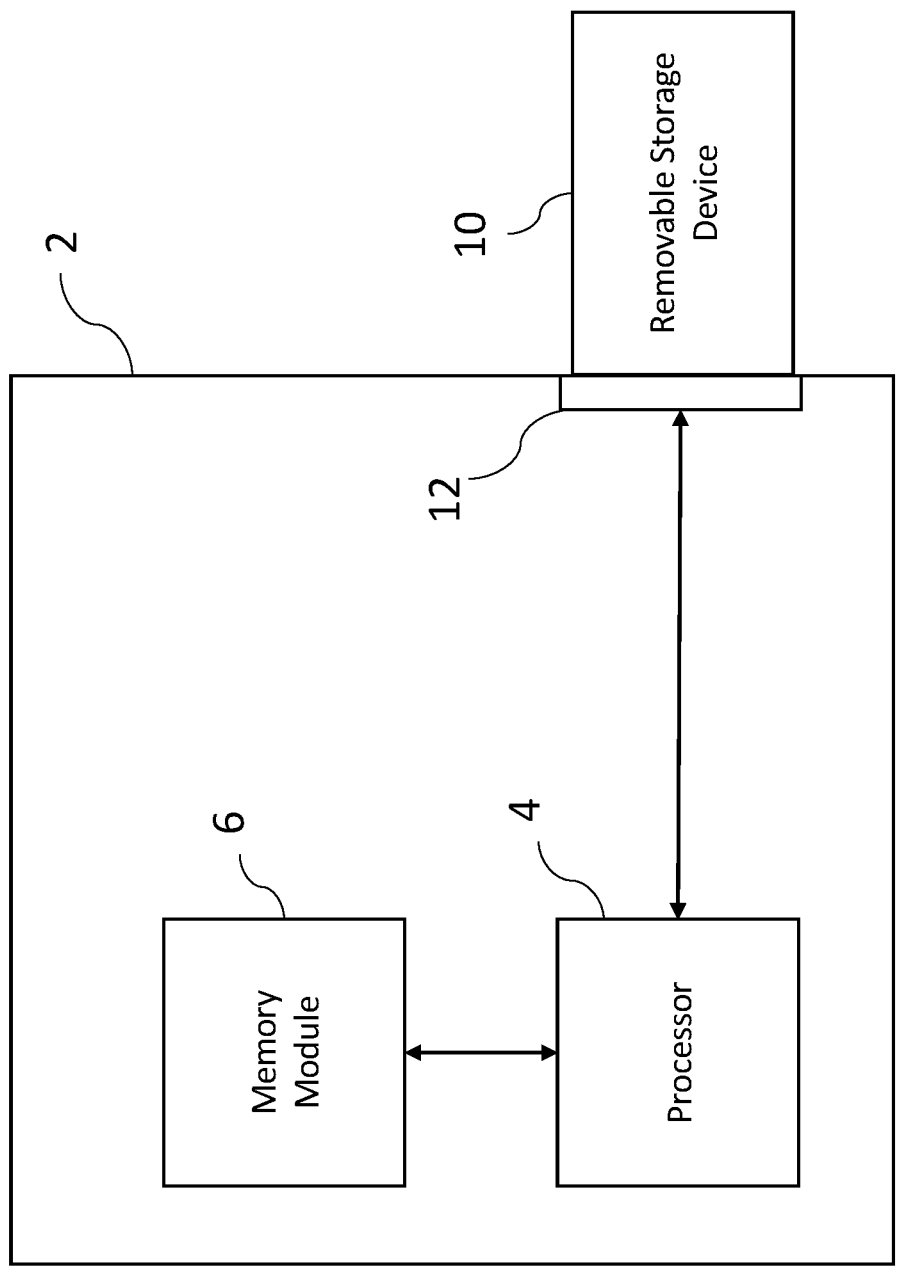
FIG. 1 is a schematic diagram of a system configured to transition from a first mode of operation to a second mode of operation when a removable storage device is coupled thereto, in accordance with an illustrative embodiment of the present invention.

In the following detailed description of various embodiments of the system and method of the present invention, numerous specific details are set forth in order to provide a thorough understanding of various aspects of one or more embodiments. However, the one or more embodiments may be practiced without some or all of these specific details. In other instances, well-known methods, procedures, and/or components have not been described in detail so as not to unnecessarily obscure aspects of embodiments.

Articles "a" and "an" are used herein to refer to one or to more than one (i.e. at least one) of the grammatical object of the article. By way of example, "an element" means at least one element and can include more than one element. Unless otherwise defined, all technical terms used herein have the same meaning as commonly understood by one of ordinary skill in the art to which this disclosure belongs.

The drawing figures are not necessarily to scale and certain features of the invention may be shown exaggerated in scale or in somewhat schematic form in the interest of clarity and conciseness. In this description, relative terms such as "horizontal," "vertical," "up," "down," "top," "bottom," as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation.

Terms including "inwardly" versus "outwardly," "longitudinal" versus "lateral" and the like are to be interpreted relative to one another or relative to an axis of elongation, or an axis or center of rotation, as appropriate. Terms concerning electrical attachments, coupling and the like, such as "electrically connected," "electrically coupled," or "in signal communication" refer to a relationship wherein elements are electrically coupled to one another either directly or indirectly through intervening elements and through any combination of wired or wireless communication channels.

While preferred embodiments are disclosed, still other embodiments of the system and method of the present invention will become apparent to those skilled in the art from the following detailed description, which shows and describes illustrative embodiments. As will be realized, the following disclosure is capable of modifications in various obvious aspects, all without departing from the spirit and scope of the present invention. Also, the reference or non-reference to a particular embodiment of the invention shall not be interpreted to limit the scope of the present invention.

FIG. 1 is a schematic diagram of a system 2 capable of providing multiple levels of functionality to a user, in accordance with an illustrative embodiment of the present invention. The system 2 can be any type of system that can be configured to provide multiple levels functionality to a user. Each level of functionality can include one or more discreet functions. As an illustrative example, the system 2 can be a video system, such as a medical video recording system, that is configured to provide video recording, video editing, video review, video playback, etc. As another illustrative example, the system 2 can be a data system configured to provide data storage, data recall, data sorting, etc. Although examples of systems 2 are provided herein, it will be appreciated that the disclosed systems and methods may be applied to any system that can implement multiple levels of functionality and that is configured to receive a removable storage device 10.

The system 2 includes a processor 4 configured to implement the multiple levels of functionality and a memory module 6 configured to store code for implementing the multiple levels of functionality. In one illustrative embodiment, memory module 6 includes code for implementing a "first mode" of operation in which a first level of functionality is enabled and a "second mode" of operation in which at least one additional level of functionality is enabled. As indicated above, each level of functionality can include one or more discreet functions that are associated with the respective functionality level. In one illustrative embodiment, the processor 4 is configured to implement a first mode of operation when the system 2 is initially powered on (e.g., placed in an initial state).

The processor 4 may comprise any processing circuitry operative to control the operations and performance of the system 2. In various aspects, the processor 4 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor 4 also may be implemented by a controller, a microcontroller, an application specific integrated circuit (ASIC), a field programmable gate array (FPGA), a programmable logic device (PLD), and so forth.

In various aspects, the processor 4 may be arranged to run an operating system (OS) and various applications. Examples of an OS comprise, for example, operating systems generally known under the trade names of Apple OS, Microsoft Windows OS, Android OS, and any other proprietary or open source OS. Examples of applications comprise, for example, a telephone application, a camera (e.g., digital camera, video camera) application, a browser application, a multimedia player application, a gaming application, a messaging application (e.g., email, short message, multimedia), a viewer application, and so forth.

The memory module 6 may comprise any machine-readable or computer-readable media capable of storing data, including both volatile/non-volatile memory and removable/non-removable memory. For example, memory module 6 may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In a preferred embodiment, the second mode of operation can be enabled by coupling a pre-configured removable storage device 10 to the system 2. For example, in one illustrative embodiment, the system 2 includes an interface 12 configured to receive and/or couple the removable storage device 10 to the system 2. The removable storage device 10 can include any suitable removable storage device, such as, for example, a secure digital (SD) card, a universal serial bus (USB) device, a removable media (such as a CD-ROM, DVD-ROM, etc.), and/or any other suitable removable storage device 10.

The one or more additional levels of functionality enabled in the second mode of operation may include hardware functions and/or software functions. In one illustrative embodiment, all of the possible functions available from the system 2 are programmed and identified in programming executed by the system 2, such as firmware contained on memory module 6, which is integrated into the system 2. A first level of functionality, which includes one or more functions, is initially enabled by the system 2. The processor 4 can be configured to detect the removable storage device 10 and enable one or more additional levels of functionality based on a key or other programming contained on the removable storage device 10.

The removable storage device 10 is coupled to the system 2 (for example, through interface 12) and provides a key or other indication to the processor 4 to authorize a second mode of operation that includes at least one additional level of functionality. For example, in one illustrative embodiment, the removable storage device 10 stores a cryptographic key. The cryptographic key may correspond to any suitable cryptographic algorithm, such as, for example, symmetric encryption algorithms including data encryption standard (DES), advanced encryption standard (AES), international data encryption algorithm (IDEA), RC4, RC5, RC6, Blowfish, Twofish, Threefish, asymmetric algorithms including Diffie-Hellman, Rivet-Shammir-Aldemna (RSA), Elliptic Curve Cryptography (ECC), SSL/TLS, public/private key algorithms, SHA256, and/or any other suitable algorithm.

Figure 2:
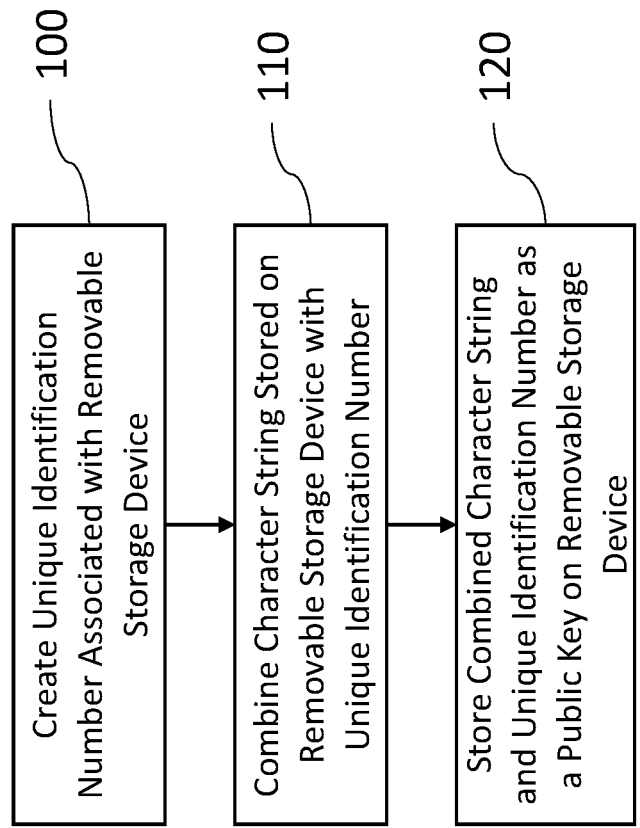
FIG. 2 is a flowchart of a method of generating a public key for storage on a removable storage device, in accordance with an illustrative embodiment of the present invention.

In some embodiments, the removable storage device 10 includes one half of a key pair, such as a public key of a public/private key pair. The key contained on the removable storage device 10 can be generated using any suitable method known in the art. An illustrative example is shown in FIG. 2, which is a flowchart of an illustrative method of generating a public key for storage on a removable storage device. Although the method shown in FIG. 2 is one illustrative method of generating a key, it should be appreciated that any suitable method known in the art for generating a key may be used.

The method starts at step 100, where a unique identification number that is associated with the removable storage device 10 is identified. The unique identification number can be, for example, a serial number associated with the removable storage device 10. Then, at step 110, the unique identification number associated with the removable storage device 10 is combined with a character string stored on the removable storage device 10. The character string can be, for example, an alpha-numeric string. In one illustrative embodiment, the unique identification number associated with the removable storage device 10 is combined with the character string by appending the unique identification number to the character string.

Then, at step 120, the combined character string and unique identification number is stored as a public key on the removable storage device 10. A public key based at least partially on a unique identification number of the removable storage device 10 prevents copying or duplication of the removable storage device 10 and/or the public key stored on the removable storage device 10.

In one illustrative embodiment, the public key is generated by appending the unique identification number to the alpha-numeric string stored on the removable storage device 10, although it should be appreciated that any suitable method known in the art for generating a key may be used. As discussed above, a public key based at least partially on a unique identification number of the removable storage device 10 prevents copying or duplication of the removable storage device 10 and/or the key stored on the removable storage device 10.

In one illustrative embodiment, the public key stored on the removable storage device 10 is associated with a private key that is known by the manufacturer of the system 2 and/or incorporated into the system 2 and/or a specific component of the system 2. For example, in some embodiments, a private key may be stored in the memory 6 formed integrally with the system 2. In some embodiments, the private key may be maintained in a key store or token store that is isolated from other components in the system 2.

Figure 3:
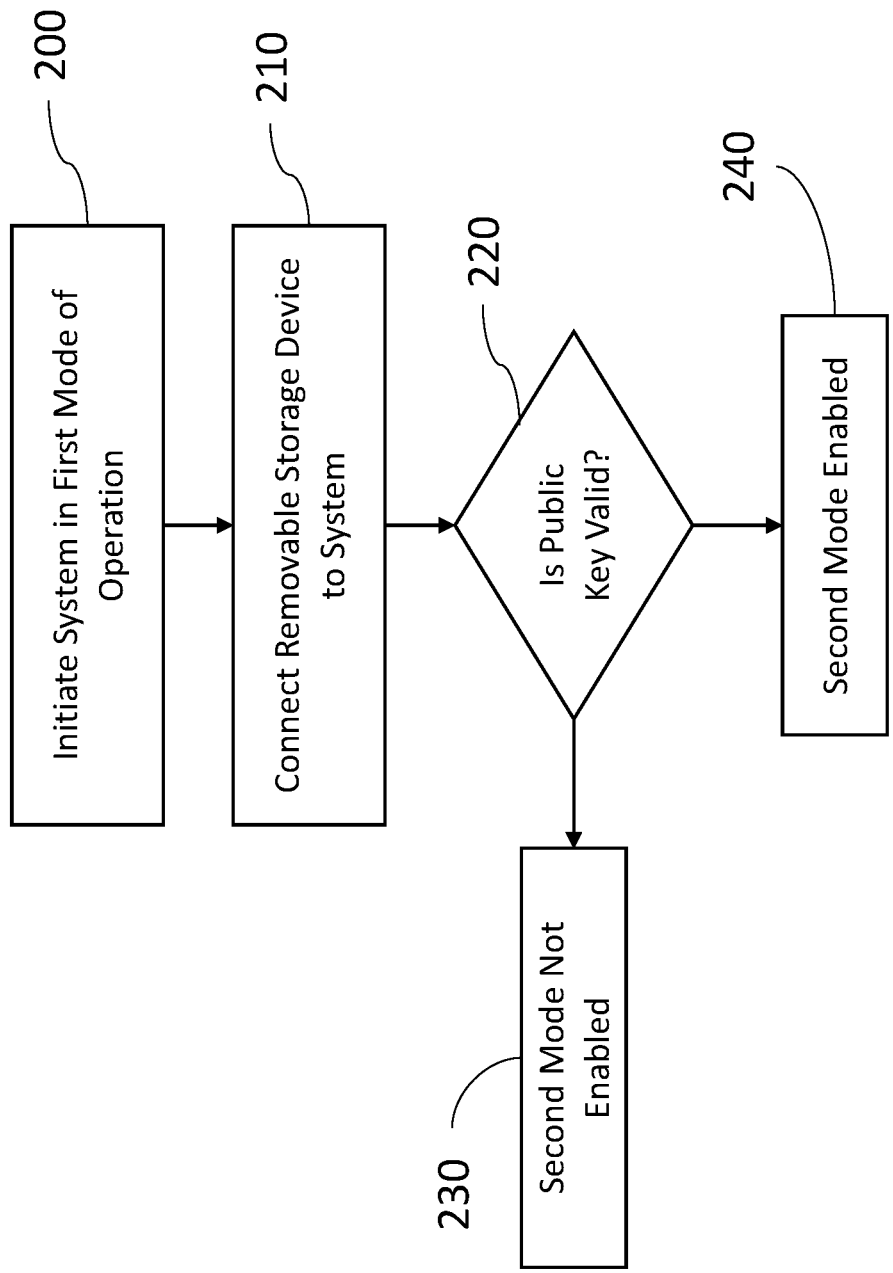
FIG. 3 is a flowchart of a method of authorizing a second mode of operation of a system using a removable storage device, in accordance with an illustrative embodiment of the present invention.

In use, when the removable storage device 10 is inserted into the interface 12, the processor 4 is configured to load the private key and verify the validity of the public key provided by the removable storage device 10 which, if validated, authorizes a second mode of operation for the system 2. FIG. 3 is a flowchart of an illustrative method of authorizing a second mode of operation of a system 2 using a key pair.

The method starts at step 200, where a first mode of operation is initiated in system 2. Then, at step 210, a removable storage device 10 is connected to system 2. At step 220, the processor 4 of system 2 determines whether the public key stored on the removable storage device 10 is valid using the private key stored in either the memory 6 of system 2 or in a key store or token store that is isolated from the system 2. The processor 4 may apply any suitable verification process applicable to the encryption scheme used to generate the encryption keys. For example, in some embodiments, the processor 4 may be configured to calculate a checksum using the public and private keys and compare the checksum to a predetermined value to indicate whether the public key is valid. In other embodiments, the processor 4 may encrypt and/or decrypt one or more files using the public and/or private keys to validate the public key.

If the public key is determined to be invalid, then the second mode is not enabled at step 230. If the public key is determined to be valid, then at step 240 the processor 4 enables the second mode of operation, in which at least one additional level of functionality is enabled. For example, in some embodiments, the processor 4 is configured to activate one or more additional software methods, hardware components, features, functions, etc. included with the system 2. If the system 2 is a video system, then examples of additional functionality include, but are not limited to video editing, video review, etc. In some embodiments, the processor 4 decrypts one or more files required for the at least one additional level of functionality and places the decrypted files into memory 6.

Although a cryptographic key pair has been described in detail above as one preferred mechanism for authorizing one or more additional modes of operation, it should be appreciated that other forms of authentication that utilize the removable storage device 10 can be used while still falling within the scope of the present invention. For example, the removable storage device 10 can incorporate a password or other digital signature that is recognized by the processor 4 in order to enable additional modes of operation.

The present invention simplifies management of distributed digital devices by allowing the use of a single firmware and/or update file, while relying on removable storage devices 10 for enabling various features included in the firmware/system. For example, in some embodiments, a new level of functionality that includes one or more new functions or features may be provided to existing systems 2 using an update over networked communication, such as over the Internet or over other network infrastructure. The system 2 can be updated with the new feature in a non-enabled state. If a user wishes to access the new level of functionality, the user can contact the distributor of the system 2 and/or the distributor of the update, pay an additional fee (or perform some other action), and obtain a removable storage device 10 containing at least part of a key configured to enable the new level of functionality. Alternatively, the removable storage device can include the software and/or firmware required to enable the one or more additional modes of operation.

The foregoing embodiments and advantages are merely exemplary, and are not to be construed as limiting the present invention. The description of the present invention is intended to be illustrative, and not to limit the scope of the claims. Many alternatives, modifications, and variations will be apparent to those skilled in the art. Various changes may be made without departing from the spirit and scope of the invention.

What is claimed is:

1. A system, comprising:
   a memory module that stores code comprising a set of processor executable instructions for enabling a first mode of operation in which a first level of functionality is enabled and at least a second mode of operation in which at least a second level of functionality is enabled if the second mode of operation is authorized, wherein the first level of functionality comprises an initial state and the at least the second level of functionality comprises video recording;
   a processor for executing the code stored in the memory module; and
   an interface for receiving a removable storage device that stores code comprising a set of processor executable instructions for authorizing the at least second mode of operation;
   wherein the processor:
      only executes the code stored in the memory module for enabling the first mode of operation in which the first level of functionality, comprising the initial state, is enabled when the system is initially powered on,
      determines whether the code stored in the removable storage device for authorizing the at least second mode of operation, in which the at least the second level of functionality comprising video recording, is valid, and
      executes the code stored in the memory module for enabling the at least second mode of operation in which the second level of functionality is enabled if the code stored in the removable storage device is determined to be valid.

2. The system of claim 1, wherein the second level of functionality comprises at least one discreet function.

3. The system of claim 1, wherein the removable storage device comprises a secure digital card, universal serial bus device, a CD-ROM or a DVD-ROM.

4. The system of claim 1, wherein the code for authenticating at least a second mode of operation comprises a cryptographic key.

5. The system of claim 4, wherein the cryptographic key stored in the removable storage device comprises a first half of a cryptographic key pair, and wherein a second half of the cryptographic key pair is stored in the memory module.

6. The system of claim 5, wherein the first half of the cryptographic key pair comprises a public key and the second half of the cryptographic key pair comprises a private key.

7. The system of claim 6, wherein the public key comprises:
   a character string; and
   a unique identification number associated with the removable storage device appended to the character string.

8. The system of claim 4, wherein the cryptographic key stored in the removable storage device comprises a first half of a cryptographic key pair, and wherein a second half of the cryptographic key pair is stored at a location that is isolated from the processor and memory module.

9. The system of claim 1, wherein the code for authenticating at least a second mode of operation comprises a password.

10. The system of claim 1, wherein the code for authenticating at least a second mode of operation comprises a digital signature.

11. A video system comprising the system of claim 1.

12. The video system of claim 11, wherein the second level of functionality further comprises at least one of video editing, video review and video playback.

13. A method of selectively enabling multiple modes of operation in a system, comprising:
   storing code comprising a set of processor executable instructions for enabling a first mode of operation in which a first level of functionality is enabled and at least a second mode of operation in which at least a second level of functionality is enabled if the second mode of operation is authorized, wherein the first level of functionality comprises an initial state;
   enabling, with a processor, only the first mode of operation in which the first level of functionality is enabled when the system is initially powered on, wherein the first level of functionality comprises an initial state;
   coupling a removable storage device to the system, wherein the removable storage device stores code comprising a set of processor executable instructions for authorizing at least the second mode of operation;
   determining, with the processor, whether the code stored in the removable storage device is a valid; and
   enabling, with the processor, the at least second mode of operation in which at least the second level of functionality is enabled if the code stored in the removable storage device is determined to be valid, wherein the second level of functionality comprises video recording.

14. The method of claim 13, wherein the removable storage device comprises a secure digital card, universal serial bus device, a CD-ROM or a DVD-ROM.

15. The method of claim 13, wherein the code for authenticating at least a second mode of operation comprises a cryptographic key.

16. The method of claim 15, wherein the cryptographic key stored in the removable storage device comprises a first half of a cryptographic key pair, and wherein a second half of the cryptographic key pair is stored in the system.

17. The system of claim 16, wherein the first half of the cryptographic key pair comprises a public key and the second half of the cryptographic key pair comprises a private key.

18. The system of claim 17, wherein the public key comprises:
   a character string; and
   a unique identification number associated with the removable storage device appended to the character string.

19. The method of claim 13, wherein the code for authenticating at least a second mode of operation comprises a password.

20. The method of claim 13, wherein the code for authenticating at least a second mode of operation comprises a digital signature.

* * * * *